Figure 1:
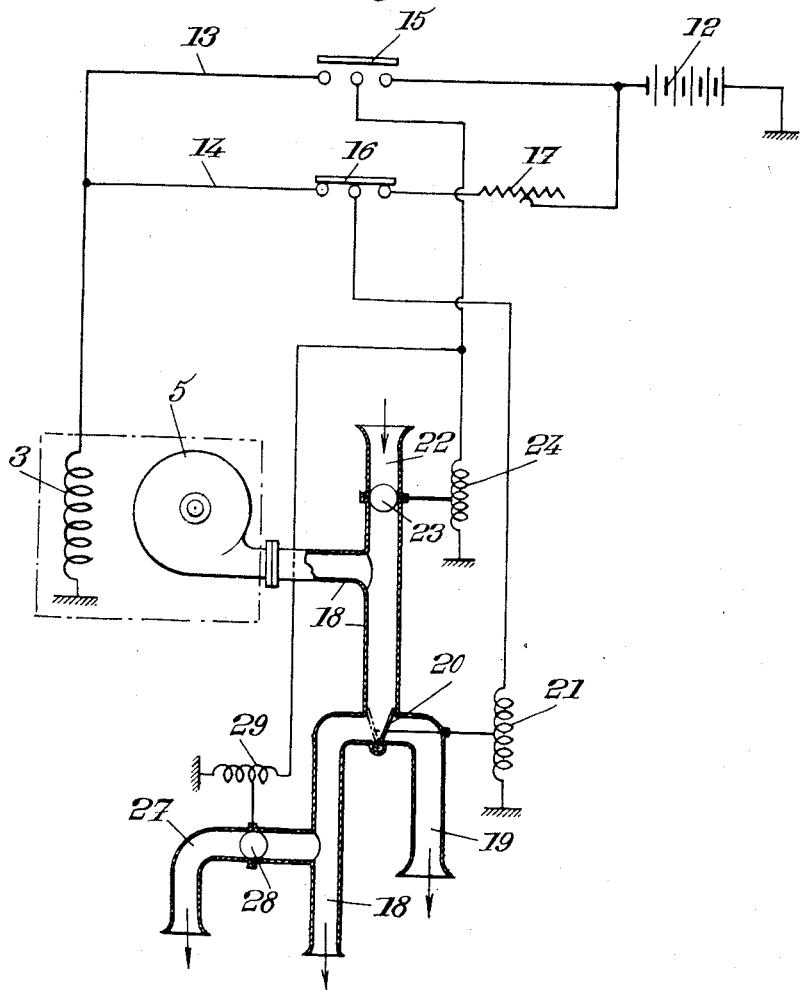

Oct. 24, 1950     P. E. BESSIÈRE ET AL     2,526,842
ELECTRIC BRAKING DEVICES, IN PARTICULAR FOR VEHICLES

Filed Feb. 19, 1949     2 Sheets-Sheet 1

INVENTORS
PIERRE ETIENNE BESSIÈRE
LOUIS EMILE PONSY
BY Mock & Blum
ATTORNEYS

Oct. 24, 1950     P. E. BESSIÈRE ET AL     2,526,842
ELECTRIC BRAKING DEVICES, IN PARTICULAR FOR VEHICLES
Filed Feb. 19, 1949     2 Sheets-Sheet 2
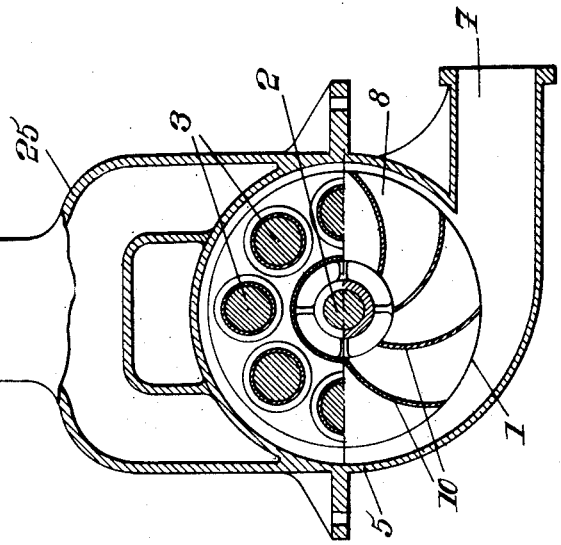
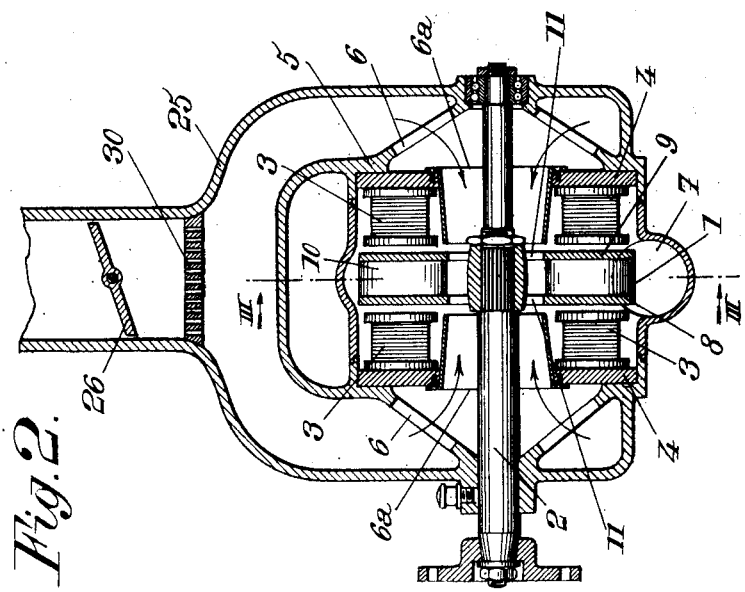
INVENTORS
PIERRE ETIENNE BESSIÈRE
LOUIS EMILE PONSY
BY Mock & Blum
ATTORNEYS Patented Oct. 24, 1950

2,526,842

UNITED STATES PATENT OFFICE 2,526,842

ELECTRIC BRAKING DEVICES, IN PARTICULAR FOR VEHICLES

Pierre Etienne Bessière, Paris, and Louis Emile Ponsy, Clichy, France, assignors to Electro-Mecanique de l'Aveyron, S. A., Rodez, France, a society of France Application February 19, 1949, Serial No. 77,344
In France January 11, 1949

7 Claims. (Cl. 172—285)

1

The present invention relates to electric braking devices, in particular for vehicles. The expression electric braking device is meant to include in particular a device essentially constituted by a stator and a rotor, said rotor being rigid with the shaft to be braked, one of these two elements including electro-magnets which, when excited by an electric current, create in the other element, when these two elements are moving relatively to each other, Foucault currents having both a braking and a heating effect.

The chief object of our invention is to make it possible to use a braking device of this kind for other purposes than that of braking the shaft above referred to.

Preferred embodiments of our invention will be hereinafter described with reference to the accompanying drawings, given merely by way of example and in which:

Fig. 1 diagrammatically shows a plant including an electric braking device according to our invention;

Figs. 2 and 3 show, respectively in longitudinal section and in transverse section on the line III—III of Fig. 2, a braking device according to our invention.

In the following description, our invention is supposed to be applied to an automobile vehicle, such as a lorry, a railway automobile vehicle, etc.

The electric braking device proper, with the exception of the energizing means and cooling air inlet and outlet conduits thereof, is of any suitable construction, for instance as shown by Figs. 2 and 3.

In these figures, the braking device includes a magnetic metal rotor 1 rigid with the shaft 2 to be braked. This rotor is located between two sets of electro-magnets 3 inserted in a suitable electric circuit and carried by the side plates 4, also made of a magnetic material, of a stator. These electro-magnets are so arranged that their magnetic flux extends through rotor 1, so that Foucault currents are produced therein, when it is rotating relatively to the electro-magnets.

In order to cause a stream of cooling air to flow through the braking device, we provide, in the frame 5 of the braking device, orifices 6—6a through which air enters the braking device from both sides. We further provide a tangential conduit 7 for the outflow of the air that has passed through the device, the rotor acting as a fan wheel. In order to improve the fan action of the rotor, said rotor may be given the shape indicated by Figs. 2 and 3, i. e. it may be constituted by two discs 8, 9, connected together by blades 10 and provided,

2 near their axis, with orifices 11. The air in casing 5 can thus enter the rotor through these orifices 11, and then flow through said rotor from the inside toward the outside, passing between blades 10 and finally reaching outlet conduit 7.

Obviously the excitation of electro-magnets 3 must be high enough to give a substantial braking torque. At the same time, when the brake is in action, the amounts of air to be evacuated are considerable, since the whole of the energy to be dissipated must be transformed into heat which is to be evacuated in order to avoid too high a heating of the braking device.

Up to the present time, braking devices of this kind have been used only for the obtainment of a braking torque. The object of our invention is to use these braking devices for heating the vehicles on which they are fitted. In view of the fact that the periods generally do not correspond exactly with the periods for which heating is required during which the device is used for braking purposes, we provide, according to our invention, means to reduce, when so desired, the energizing of the electro-magnets so that the braking effect becomes negligible and there remains only a moderate production of heat serving to heat the vehicle.

For this purpose, we may proceed as shown by Fig. 1, where the braking device is diagrammatically illustrated by its casing 5 and the coils 3 of its electro-magnets. These coils are connected to the source of energizing current, which is constituted for instance by the battery 12 of the vehicle through two parallel conductors 13 and 14, and a switch 15, 16 is inserted in each of these conductors. Furthermore conductor 14 includes a resistance 17, preferably an adjustable one.

When the device is to be used as a brake, we close the switch 15 of conductor 13 in order to have an intensive energizing of the electro-magnets and thus to obtain a high braking torque. On the contrary, when it is desired to use the device for heating purposes, switch 15 is left open and only switch 16 is closed. Due to the presence of resistance 17, we obtain but a low energizing of the electro-magnets. In these conditions, the braking action is negligible but the heating effect is sufficient. This low excitation and, consequently, the heating effect can be adjusted by means of rheostat 17.

In order to convey the heat produced by braking device 3—5 to the desired place we provide, on the outlet tube 7 of the braking device one or several conduits 18 which feed the hot air from the braking device to the place or places to be heated. When it is desired to heat the cabin or body of a vehicle, this air may be either introduced directly into the cabin or passed through a heat interchanger (radiator).

When the weather is hot, it is obviously necessary, when the device is used for braking purposes, to prevent air from the braking device from incommoding the passengers of the vehicle. This is why we connect with conduit 18 a pipe 19 in direct communication with the atmosphere and we provide a control member, for instance a valve 20, to pass the hot air from the braking device either toward the space to be heated or toward the atmosphere. This valve may be actuated by an electromagnetic device 21 which brings the valve into the position shown in solid lines when switch 16 is closed, whereas valve 20 assumes the position shown in dotted lines when switch 16 is open.

When shifting from mere heating conditions to braking and heating conditions, it is necessary to make sure that neither the amount nor the temperature of the air fed to the space to be heated exceed certain limits despite the high increase of heat produced by the device as soon as it is used for braking purposes.

To this effect, we may either mix cold air with the hot air issuing from the braking device, or increase the amount of air flowing through the said device.

In the first case, we connect with conduit 18 a pipe 22 in communication with the atmosphere and fitted with a valve 23 so that, when valve 23 is open, the hot air stream flowing through conduit 18 sucks in fresh air from the atmosphere through pipe 22. In order to open valve 23, which is normally closed, for instance by means of a spring, we may provide electromagnetic control means 24 energized by the closing of switch 15, which corresponds to operation of the device as a brake. As long as these conditions are lasting, cold air is mixed with the hot air that flows out from the braking device. Preferably, the inlet opening of pipe 22 is directed toward the front of the vehicle.

In the second case, i. e. in order to vary the amount of air that flows through the braking device, we may provide, in the suction conduit 25 of the braking device, a shutter 26 (Fig. 2) which, as long as the device is used merely for heating purposes, is held nearly closed (for instance by a spring) and which opens fully when switch 15 is closed, i. e. when the device is used as a brake. This opening can be obtained by means of a control member analogous to the above mentioned part 24.

Instead of giving shutter 26, when switch 15 is open, a single determined position, it may be advantageous to bring this shutter nearer and nearer to its wide open position as the heating effect increases, for instance by simultaneously controlling said shutter and rheostat 17.

In some cases, when the device is being used both for braking and heating purposes, it may be useful to permit direct exhaust into the atmosphere of a portion of the hot air before it enters the space to be heated. For this purpose, we may connect with conduit 18, on the downstream side of valve 20, a pipe 27 controlled by a valve 28 and in communication with the atmosphere. This valve can be opened, by means of an electromagnetic device 29, when switch 15 is closed.

It should be noted that electromagnetic control means 21, 24, 29 may be replaced by manual control means preferably operatively connected with the levers through which switches 15 and 16 are actuated.

According to another feature of our invention, the air intake conduit 25 and/or the air exhaust conduit to the atmosphere, for instance conduit 19, are so arranged that the relative wind due to the movement of the vehicle on which the braking device is fitted increases the amount of cooling air flowing therethrough. By disposing the inlet of the braking device air intake conduit toward the front of the vehicle, we obtain an overpressure at the front of the braking device. Inversely, by disposing the exhaust end of the cooling air exhaust conduit toward the rear, the relative wind has a suction effect on the inside of this exhaust conduit. In both cases, we thus accelerate the flow of cooling air through the braking device and we intensify the cooling thereof.

When the braking device fitted with an air intake conduit acts at the same time as a heating fan injecting hot air into a space to be heated, the location of the inlet of said conduit at the front, in a region where air is clean has the further advantage of preventing this air from driving along oil or gasoline vapors which might incommodate the persons in the space to be heated. Furthermore, in this case, it is advantageous to provide, in the collecting conduit, an air filter 30 for stopping dust present in the air sucked in by the braking device.

The cooling fluid of the braking device is not necessarily air but might be a liquid, for instance water.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. For use in connection with a structure including a rotary part and a space to be heated, a combined braking and heating device which comprises an electric brake for said part, a cooling system for said brake including an air circuit having an intake open to the atmosphere, valve means for connecting the outlet of said air circuit alternately with said space and with the atmosphere, electric means for energizing said brake, means for adjusting the energy transmitted from said energizing means to said brake capable of reducing the braking torque of said brake to a negligible value while letting a substantial amount of heat be supplied by said brake to the air stream flowing through said air circuit, and means for operatively connecting said valve means and said adjusting means.

2. For use in connection with a structure including a rotary part and a space to be heated, a combined braking and heating device which comprises an electric brake for said part, a cooling system for said brake including an air circuit having an intake open to the atmosphere, electric means for energizing said brake, electric transmitting means between said energizing means and said brake capable of imparting substantially the whole of the energy of said energizing means to said brake, a brake control switch in said electric transmitting means, distinct electric transmitting means between said energizing means and said brake adapted to impart to said brake a limited portion of the energy of said energizing means such that a substantial amount of heat is given off by said brake to the air stream flowing through the air circuit whereas the braking torque is practically negligible, a heating control switch in said last mentioned electric transmitting means, and valve means operatively connected with said heating control switch for connecting the outlet of said air circuit with said space to be heated when said last mentioned switch is closed and with the atmosphere when said switch is open.

3. For use in connection with a structure including a rotary part and a space to be heated, a combined braking and heating device which comprises an electric brake for said part, a cooling system for said brake including an air circuit having an intake open to the atmosphere, a source of electric energy for energizing said brake, an electric conductor between said source and said brake capable of imparting substantially the whole of the energy of said source to said brake for energization thereof, a brake control switch inserted in said conductor, a second electric conductor in shunt with the first one between said source and said brake, a resistor inserted in said second conductor to impart to said brake only a limited portion of the energy of said source such that a substantial amount of heat is given off by said brake to the air stream flowing through the air circuit whereas the braking torque is practically negligible, a heating control switch inserted in said second conductor, and valve means operatively connected with said heating control switch for connecting the outlet of said air circuit with said space to be heated when said last mentioned switch is closed and with the atmosphere when said switch is open.

4. A device according to claim 3 including electric means for operating said valve means, and an electric circuit for said electric means including contacts arranged to cooperate with said heating control switch.

5. A device according to claim 3 further including an air intake conduit leading directly to said valve means on the upstream side thereof, and valve means operatively connected with said brake control switch for opening said air intake conduit when said brake control switch is closed and closing said conduit when said last mentioned switch is opened.

6. A device according to claim 3 further including a branch conduit leading directly from the downstream side of said valve means to the atmosphere and valve means operatively connected with said brake control switch for opening said branch conduit when said brake control switch is closed and closing said conduit when said last mentioned switch is opened.

7. A device according to claim 3 further including valve means in said air circuit on the upstream side of said brake and means operatively connected with said brake control switch for closing said last mentioned valve means when said brake control switch is opened and vice-versa.

PIERRE ETIENNE BESSIÈRE.
LOUIS EMILE PONSY.

REFERENCES CITED

The following references are of record in the file of this patent:

UNITED STATES PATENTS

| Number | Name | Date |
| --- | --- | --- |
| 1,938,077 | Lysholm | Dec. 5, 1933 |
| 2,232,587 | Brandt | Feb. 18, 1941 |
| 2,355,484 | Teker | Aug. 8, 1944 |

FOREIGN PATENTS

| Number | Country | Date |
| --- | --- | --- |
| 494,497 | Great Britain | Oct. 26, 1938 |
| 546,735 | Great Britain | July 28, 1942 |

OTHER REFERENCES

General Electric Review, Apr. 1918, page 242.